US008856267B2

(12) United States Patent
Sullivan et al.

(10) Patent No.: US 8,856,267 B2
(45) Date of Patent: *Oct. 7, 2014

(54) NETWORK AUDIO DIRECTORY SERVER AND METHOD

(75) Inventors: Terence Sean Sullivan, Somerville, MA (US); Richard E. Barnett, Newton, MA (US); Terence Brennan, Melbourne, FL (US)

(73) Assignee: RangeCast Technologies, LLC, Ely, NV (US)

( * ) Notice: Subject to any disclaimer, the term of this patent is extended or adjusted under 35 U.S.C. 154(b) by 1704 days.

This patent is subject to a terminal disclaimer.

(21) Appl. No.: 11/600,476

(22) Filed: Nov. 16, 2006

(65) Prior Publication Data

US 2008/0117899 A1  May 22, 2008

(51) Int. Cl.
| | | |
|---|---|---|
| *G06F 15/16* | (2006.01) | |
| *H04L 29/12* | (2006.01) | |
| *H04L 29/08* | (2006.01) | |
| *H04L 29/06* | (2006.01) | |

(52) U.S. Cl.
CPC ............ H04L 67/16 (2013.01); H04L 61/15 (2013.01); H04L 29/12047 (2013.01); *H04L 65/1059* (2013.01); *H04L 65/4084* (2013.01)
USPC ...................................................... 709/217

(58) Field of Classification Search
USPC ................................................. 709/217, 231
See application file for complete search history.

(56) References Cited

U.S. PATENT DOCUMENTS

| | | | |
|---|---|---|---|
| 5,608,662 A | 3/1997 | Large et al. | |
| 6,014,687 A | 1/2000 | Watanabe et al. | |
| 6,222,841 B1 * | 4/2001 | Taniguchi | 370/389 |
| 6,381,314 B1 | 4/2002 | Walinski | |
| 6,389,463 B2 | 5/2002 | Bolas et al. | |
| 6,442,598 B1 * | 8/2002 | Wright et al. | 709/217 |
| 6,581,103 B1 | 6/2003 | Dengler | |
| 6,625,135 B1 * | 9/2003 | Johnson et al. | 370/332 |
| 6,647,389 B1 * | 11/2003 | Fitch et al. | 1/1 |
| 6,711,622 B1 * | 3/2004 | Fuller et al. | 709/231 |
| 6,934,277 B1 | 8/2005 | Werve et al. | |
| 6,957,264 B1 * | 10/2005 | Jacobs | 709/231 |
| 7,002,992 B1 * | 2/2006 | Shaffer et al. | 370/468 |
| 7,093,028 B1 * | 8/2006 | Shao et al. | 709/240 |

(Continued)

OTHER PUBLICATIONS

RFC 793, Transmission Control Protocol, Sep. 1981, pp. 1-85.*

(Continued)

*Primary Examiner* — John MacIlwinen
(74) *Attorney, Agent, or Firm* — Dan Brown Law Office; Daniel R. Brown

(57) ABSTRACT

A system and method of communicating audio through a network. The method includes detecting audio content from an audio source by a first network terminal, sending a directory packet including a network address of the detected audio content to a second network terminal, and requesting the audio content through the network by the second audio terminal. The further step of storing the detected audio content in a buffer for audio packets identified by packet identities may be added. The sending a directory packet step may include sending a packet identity, and the requesting step may include specifying an audio packet according to the packet identity. A further step of sending a source packet including the network address of the detected audio content to a network directory server by the first network terminal may be added. The network directory server may execute the sending a directory packet step.

28 Claims, 10 Drawing Sheets

(56) References Cited

U.S. PATENT DOCUMENTS

| | | | |
|---|---|---|---|
| 7,162,418 B2* | 1/2007 | Leichtling et al. | 704/215 |
| 7,162,533 B2* | 1/2007 | Klemets | 709/231 |
| 2001/0027399 A1 | 10/2001 | Yasushi et al. | |
| 2001/0051958 A1 | 12/2001 | deVries et al. | |
| 2002/0091790 A1 | 7/2002 | Cubley | |
| 2003/0093485 A1* | 5/2003 | Dougall et al. | 709/208 |
| 2004/0002970 A1 | 1/2004 | Hur | |
| 2004/0047366 A1* | 3/2004 | Chowdhury | 370/466 |
| 2004/0098341 A1 | 5/2004 | Urich et al. | |
| 2005/0010961 A1 | 1/2005 | Hagen et al. | |
| 2005/0058145 A1* | 3/2005 | Florencio et al. | 370/412 |
| 2005/0232282 A1 | 10/2005 | Silver et al. | |
| 2006/0026295 A1* | 2/2006 | Iwamura | 709/233 |
| 2006/0126494 A1 | 6/2006 | Dougall et al. | |
| 2006/0288395 A1* | 12/2006 | DiLorenzo | 725/113 |
| 2008/0051916 A1* | 2/2008 | Morris | 700/94 |

OTHER PUBLICATIONS

Jonas, Karl et al. "Audio Streaming on the Internet—Experiences with Real-Time Streaming of Audio Streams". ISIE'97. IEEE Catalog No. 97TH8280. 1997. pp. 71-76.*

* cited by examiner

NETWORK AUDIO DIRECTORY SERVER AND METHOD

BACKGROUND OF THE INVENTION

1. Field of the Invention

The present invention relates to network coupled audio communications. More specifically, the present invention relates to an apparatus and method for selectively communicating intermittent audio content through a network, such as the Internet, using a directory stream that identifies available audio content.

2. Description of the Related Art

Co-pending U.S. patent application Ser. No. 11/418,960 to Barnett et al. filed on May 5, 2006 (hereinafter "Barnett-1") for an Internet audio scanner and method, the contents of which are hereby incorporated by reference, was submitted by the inventors hereof. Barnett-1 discloses an apparatus and method for processing signals produced by signal sources, including a first signal source that is a first server of streaming audio signals, which include intermittent audio content, and which is located at an address on a network. The apparatus includes a network interface and a processor that selects the first signal source by outputting the address of the first server to the network interface, thereby establishing a network connection. The apparatus also includes a threshold detector coupled to receive streaming audio signals through the network interface, and that has a detector output with an active state that indicates that the intermittent audio content presently meets a threshold value. The processor further couples the streaming audio content to an output circuit if the detector output is active. Where there are plural intermittent signal sources, the apparatus of Barnett 1 can sequentially monitor the plural sources and process the audio content based upon the threshold detector output.

It is envisioned that the novel apparatus and method of Barnett 1 will be adopted in the market and will grow to a very large number of signal sources throughout the Internet. As the number of available signal sources increases, challenges will arises for consumers of the active audio content as to how to monitor and select the ever increasing receiving and listening options. An increasing number of monitored sources will reduce the frequency with which each individual source can be monitored for active audio content. Various users will have listening preferences that may exclude or include certain classes of audio sources. Thus, it can be appreciated that there is a need in the art for a system and method for communicating audio through a distributed network in an environment including a large number of audio sources from which plural users may select desirable or pertinent content.

SUMMARY OF THE INVENTION

The need in the art is addressed by the methods and systems of the present invention. The present invention teaches a method of communicating audio through a network. The method includes detecting audio content from an audio source by a first network terminal, sending a directory packet including a network address of the detected audio content to a second network terminal, and requesting the audio content through the network by the second audio terminal.

In a specific embodiment, the method includes the further step of sending a source packet including the network address of the detected audio content to a network directory server by the first network terminal. In addition, the sending a directory packet step is accomplished by the network directory server. In another specific embodiment, the method includes the further step of storing the detected audio content in a buffer for audio packets identified by network addresses. The sending a source packet step and the sending a directory packet step further include sending a network address, and, the requesting step includes specifying an audio packet according to the network address. In a refinement to this method, the storing step occurs in a buffer located in the network directory server.

In a specific embodiment of the foregoing method, wherein the audio source provides source data related to the audio source, the step of including audio source data in the directory packet is added. In a refinement to this embodiment, the method adds the step of applying selection criteria to the audio source data by the second network terminal, and if the audio source data does not match the selection criteria, discarding the directory packet.

In a specific embodiment of the foregoing method, the method includes the further step of adding source priority data that is related to the audio content to the directory packet. In a refinement to this embodiment, the method adds the step of applying selection criteria to the source priority data by the second network terminal, and if the source priority data does not match the selection criteria, discarding the directory packet.

In a specific embodiment of the foregoing method, wherein the requesting step further includes specifying plural audio packets, and the method includes the further steps of receiving plural audio packets by the second network terminal, and replaying the plural audio packets in chronological order. In a refinement of this embodiment, wherein the plural audio packets are non-contiguous in time, the replaying step occurs in a shortened period of time by compressing the non-contiguous periods between the plural audio packets.

In a specific embodiment of the foregoing embodiment, the method includes the further step of sending an audio packet including the detected audio content from the first network terminal to a third network server, and sending a source packet including the network address of the detected audio content to a network directory server by the third network server. In addition, the sending a directory packet step is accomplished by the network directory server. In a further refinement, the method includes the further steps of storing the detected audio content in a buffer for audio packets identified by network addresses, and, the sending a source packet step and the sending a directory packet step further include sending a network address. In addition, the requesting step includes specifying an audio packet according to the network address. In yet another refinement, the storing step occurs in a buffer located in the network directory server.

In a specific embodiment of the foregoing method, the directory packet includes a time stamp related to the original time of the audio content. In another specific embodiment, the method includes the further step of storing the detected audio content in a buffer for audio packets identified by network addresses. In addition, the sending a directory packet step includes sending a network address, and the requesting step includes specifying an audio packet according to the network address. In a refinement to this embodiment, the storing step occurs in a buffer located in the first network terminal. In another refinement, the method includes the further steps of transferring a portion of the buffer of audio packets from the first network terminal to a network directory server, and addressing the portion of the buffer of audio packets at the directory server. In addition, the sending a directory packet step is accomplished by the network directory server.

In a specific embodiment of the foregoing method, wherein the audio source produces intermittent audio content, the method-provides that the detecting audio content step includes determining if a threshold condition indicating the existence of audio content is satisfied. In a refinement to this embodiment, the method includes the further step of determining the duration of the detected audio content to be stored in each audio packet based on satisfaction of the threshold condition. In another refinement, the method provides that the threshold condition is signal amplitude. In another refinement, the audio source is a radio receiver. In another refinement, the determining if a threshold condition is satisfied step occurs in the first network terminal. In another refinement, the determining if a threshold condition is satisfied step occurs in the network directory server. In a refinement to this method, the sending a directory packet step and the requesting the audio content are performed while the threshold condition is presently met, thereby initiating a transfer of the audio content before the threshold condition ceases to be met.

In other refinements to the previous methods, the detecting audio content step is satisfied for plural time intervals, and the method includes separately storing audio content from each of the plural time intervals, and transmitting the stored audio content as plural directory packets to the second network terminal. In a refinement to this method, the plural directory packets are transmitted to the second network terminal as a network stream. In another refinement, the audio content referenced in at least one of the plural directory packet is detected by the first network terminal after initiation of the network stream. In another refinement, the audio content requested by the second network terminal is reproduced as audio. In another refinement, a plurality of audio content is requested by the second network terminal in response to a plurality of directory packets, and a second requested audio content is buffered during reproduction of a first audio content and reproduced after the first audio content is complete.

The present invention also teaches a system for communicating audio through a network. The system includes a first network terminal that detects audio content from an audio source and sends a source packet including a network address of the detected audio content into the network. A network directory server receives the source packet, and sends a directory packet into the network. A second network terminal receives the directory packet and requests the audio content through the network.

In a specific embodiment of the foregoing system, the first network terminal sends a source packet including the network address of the detected audio content to a network directory server, and the network directory server sends the directory packet. In a refinement to this embodiment, the system further comprises a buffer for storing the detected audio content identified by packet identities. In addition, the directory stream includes the packet identity, and the second network terminal specifies an audio packet according to the packet identity. In another refinement, the buffer is in a memory located in the network directory server.

In a specific embodiment of the foregoing system, the audio source provides source data related to the audio source, and the first network terminal includes audio source data in the source packet. In another refinement, the second network terminal applies selection criteria to the audio source data, and if the audio source data does not match the selection criteria, discards the directory packet and does not request the audio content. In another specific embodiment of the foregoing method, source priority data, which is related to the audio content, is added to the source packet. In a refinement to this embodiment, the second network terminal applies selection criteria to the source priority data, and if the source priority data does not match the selection criteria, discards the directory packet and does not request the audio content.

In a specific embodiment of the foregoing system, the second network terminal requests plural audio packets, and receives and replays the plural audio packets in chronological order. In a refinement to this embodiment, where the plural audio packets are non-contiguous in time, the second network terminal is replays the plural audio packets in a shortened period of time by compressing the non-contiguous periods between the plural audio packets.

In a specific embodiment, the foregoing system further includes a third network server. The first network server transfers a portion of the buffer of audio packets to the third network server, and the third network server reassigns the network address. In another specific embodiment of the foregoing system, the source packet includes a time stamp related to the audio content.

In a specific embodiment of the foregoing system, the audio source produces intermittent audio content, and the first network terminal detects audio content by determining if a threshold condition indicating the existence of audio content is satisfied. In a refinement to this embodiment, the first network terminal determines the duration of the detected audio content to be stored in each audio packet based on satisfaction of the threshold condition. The threshold condition may be signal amplitude. The audio source may be a radio receiver. In another refinement, the threshold condition is determined in the first network terminal. In another refinement, the threshold condition is determined in the network directory server.

The present invention also teaches a method of communicating audio through a network. The method includes detecting audio content at plural network audio feed sources, communicating source packets, including corresponding network addresses, from the plural network audio feed sources to a network directory server, and preparing a stream of directory packets based on the source packets received from the plural network audio feed sources by the network directory server. It also includes sending the stream of directory packets to at least a first network terminal, and requesting audio content selected from the stream of directory packets through the network by the at least a first network terminal.

In a specific embodiment of the foregoing method, the plural network audio feed sources are coupled to corresponding plural audio sources. In another embodiment, the source packets omit the detected audio content and include a time stamp appended by the corresponding plural network audio feed sources. In a further refinement, further steps are added to the method. These include storing the detected audio content in plural buffers for plural audio packets identified by packet identities, and also, the communicating source packets step includes sending plural packet identities corresponding to the plural audio packets, and the requesting step includes specifying audio packets according to the plural packet identities.

The present invention teaches a further method of communicating audio through a network. This method includes detecting audio content at plural network audio feed sources, communicating buffer packets, including audio content and corresponding network addresses, from the plural network audio feed sources to a network directory server. In addition, storing a portion of the buffer packets in a buffer for plural audio packets identified by packet identities located in the network directory server, preparing a stream of directory packets based on the buffer packets received from the plural network audio feed sources by the network directory server, and sending the stream of directory packets to at least a first network terminal. Finally, the step of requesting audio content based on the packet identities selected from the stream of directory packets through the network by the at least a first network terminal.

The present invention also teaches a system for communicating audio through a network. This system includes plural network audio feed sources operable to detect audio content and communicate source packets, including corresponding network addresses, into the network, and a network directory server operable to receive the source packets from the plural network audio feed sources. The network directory server prepares a stream of directory packets based on the source packets, and sends the stream of directory packets into the network. A first network terminal receives the stream of directory packets and then requests audio content selected from the stream of directory packets through the network.

In a specific embodiment of the foregoing system, the plural network audio feed sources are coupled to corresponding plural audio sources. In another embodiment, the source packets omit the detected audio content and include a time stamp appended by the corresponding plural network audio feed sources. In yet another embodiment, the plural network audio feeds sources store the detected audio content in plural buffers for plural audio packets identified by packet identities, and sends plural packet identities corresponding to the plural audio packets in the source packets. Also, the first network terminal may requests the audio packets according to the plural packet identities.

The present invention teaches another system for communicating audio through a network. This system includes plural network audio feed sources that detect audio content and communicate buffer packets, including audio content and corresponding network addresses, into the network. A network directory server receives the buffer packets from the plural network audio feed sources, and stores a portion of the buffer packets in a buffer for plural audio packets identified by packet identities. The network directory server prepares a stream of directory packets based on the buffer packets, and sends the stream of directory packets into the network. A first network terminal receives the stream of directory packets and requests audio content selected from the stream of directory packets through the network.

DESCRIPTION OF THE INVENTION

Figure 1:
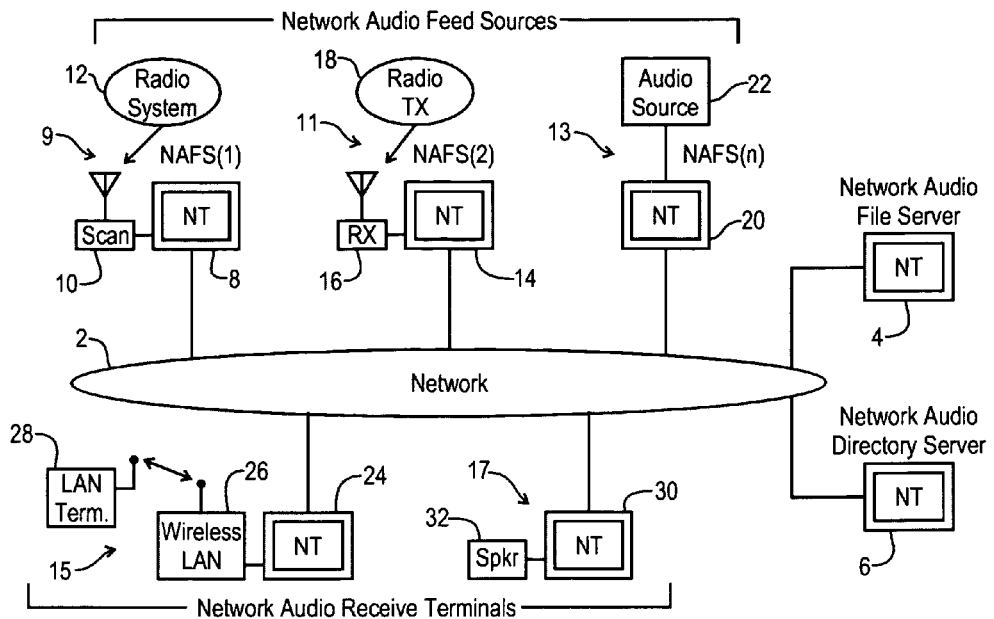
FIG. 1 is a system diagram according to an illustrative embodiment of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof and additional fields in which the present invention would be of significant utility.

In considering the detailed embodiments of the present invention, it will be observed that the present invention resides primarily in combinations of steps to accomplish various methods and components to form various apparatus. Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the disclosures contained herein.

In this disclosure, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a" does not, without more constraints, preclude the existence of additional identical elements in the process, method, article, or apparatus that comprises the element.

The present invention advances the art by teaching several embodiments of network audio control channel feeds, which are used to inform receiving stations of the existence of available audio content. Various embodiments are adapted for use with continuous audio feed sources, intermittent audio feed sources, and buffered audio feed sources. In addition, certain embodiments teach the implementation of distributed buffering of audio files, packets or similar audio information within the network to aid in network performance and load distribution. Real-time distribution, non-real-time distribution and time-compressed distribution and playback are taught. In one embodiment, a directory stream of addresses of audio file clips is fed to plural users so as to indicate the existence of available audio content buffered at one or more network addresses. In another embodiment, the directory stream includes addresses for a real-time streaming source instead of buffered audio files. In another embodiment, audio files of intermittent audio content are stored on a server, and then data tags are sent to users for later access through the network. The audio files of intermittent audio content may be redirected to a mirroring server in another embodiment. In yet another embodiment, audio sources buffer audio files and forward data tags to a server, which sends a directory listing to network receiver stations who later access the buffered audio files, and which may use time-compression to accelerate playback time. Network receiving stations may access and reproduce audio content in near real-time, or delayed in time so as to mimic real-time, or in a later time-compressed reproduction format.

Several kinds of network terminals are utilized in the teachings of the present invention. A network audio feed source ("NAFS") is a network terminal that receives audio content and is coupled to a network. A network audio directory server ("NADS") is a terminal that monitors plural NAFS locally or through the network and that provides a directory stream of available audio content into the network. A network audio file server is a terminal that is capable of storing audio content files for access by other terminals, including NART terminals. A network audio receive terminal ("NART") is a network terminal that receives directory streams and is capable of requesting audio content in response to receipt of the directory streams. The various network terminal functions can be readily combined into a single computing device. For example, the NAFS and NADS units may run on the same computer. In the case where the NAFS and NADS are merged, there is an elimination of the need for packet communications between the two separate machines. Source packets can be omitted, and the information content typical of such packets can be stored directly in the buffer packet format, which will be more fully described hereinafter.

Reference is directed to FIG. 1, which is a system diagram according to an illustrative embodiment of the present invention. A network 2, such as the Internet, couples plural network terminals together for communications according to a network communications protocol, such as the TCP/IP protocol. Plural network audio feed sources 9, 11, 13 gather audio content and are coupled to the network 2. By way of example and not limitation, the first NAFS 9 comprises a network terminal 8, such as a personal computer, coupled to a radio scanner 10, as are known to those skilled in the art. In another embodiment, the network terminal 8 and the scanner 10 are formed into a single portable unit, which comprises both functions and may include wireless access to the network 2. The scanner 10 monitors radio signals emitted from one or more radio systems 12 for the presence of intermittent audio content. When pertinent audio content is detected, a squelch circuit couples audio content to the network terminal 8. The audio content may be combined with pertinence data, such as radio frequency data, talk group data, radio service descriptors, priority data, time stamps or any other pertinent data. This information may be forwarded into the network 2, or it may be buffered with a portion of the information forwarded into the network. Destinations for such information are other network terminals. The second NAFS 11 is another example, which includes a network terminal 14 coupled to the network 2. A radio receiver 16 couples audio content and pertinence data to the network terminal, which is received from a remote radio transmitter 18. The second example is typical for applications where the broadcast frequency of the radio source 18 is known. The third NAFS 13 is an example than enables coupling of any audio source 22 to a network terminal 20, which is coupled to the network. The network terminal 20 or the audio source 22 may also provide pertinence data together with the audio content. The audio content may be continuous or intermittent in nature. In the third example, the audio source 22 is typically coupled directly to the network terminal 20, such as a microphone, audio communication circuit, or audio recording or reproduction device.

In FIG. 1, one or more network audio directory servers ("NADS") 6 are coupled to the network 2. The NADS 6 includes a network terminal 6, such as a personal computing device or other type of network server. The NADS 6 receives information from the plural NAFS 9, 11, 13, which may include all or a portion of the audio content and pertinence data. The NADS 6 processes the data and assembles a directory stream of data that is transmitted back into the network 2. The directory stream indicates the availability of audio content that is accessible through the network 2. The location of the available audio content may be in the NADS 6, in any of the NAFS 9, 11, 13, in a file server computer 4, or any combination thereof. The specific locations are identified using network addresses. The network audio file server 4 is illustrated, which provides storage, forwarding, and mirroring services for audio content, pertinence data, and other system functions that will be more fully discussed hereinafter. Plural file servers may also be employed in the network topology. The directory streams are selectively received by plural network audio receive terminals ("NART") 15, 17. Although two NART's 15, 17 are illustrated, the present invention contemplates any number of NART's in the system. By way of example and not limitation, the first NART 17 comprises a network terminal 30 having an audio reproduction circuit coupled to a loudspeaker 32. The NART 17 monitors the directory stream for pertinent content, which is user and system definable, and then accesses the pertinent content through the network 2 using network addressing. The second NART 15 is an example of providing a wireless access point, such as an Internet Wi-Fi access point for enhanced accessibility of the audio content and pertinence data. The NART 15 comprises a network terminal 24 that is coupled to the network 2. The network terminal 24 is coupled to a wireless local area network ("WLAN") transceiver 26, which communicates wirelessly with one or more WLAN terminals 28. Those of ordinary skill in the art will appreciate that any type of network terminal currently known or later developed can be used in conjunction with the teachings of the present invention.

Figure 2:
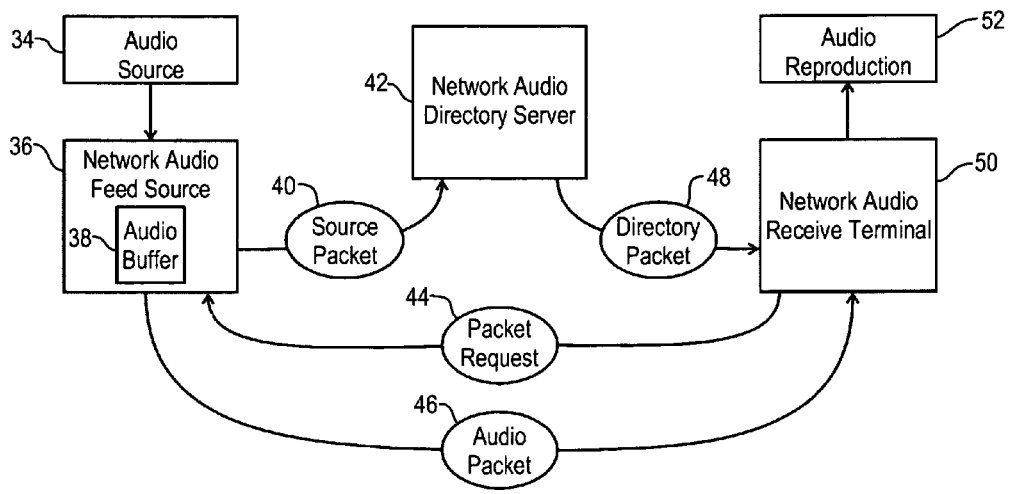
FIG. 2 is functional block diagram showing information flow according to an illustrative embodiment of the present invention.

Reference is directed to FIG. 2, which is functional block diagram showing information flow according to an illustrative embodiment of the present invention. The present invention teaches a network implemented audio distribution system and method that can be implemented in a wide range of functional and structural embodiments. Ultimately, the goal is to collect audio content from an audio source 34 and reproduce it at a point of audio reproduction 52. The present invention addresses the fundamental issues of dealing with the massive quantity of the audio content that is potentially available to consumers, and the issues surrounding the selection of such content that is pertinent to particular consumer's interests. FIG. 2 illustrates one embodiment that addresses these issues. Information is created at, or originates from, an audio source 34, which is coupled to a NAFS 36. The NAFS 36 includes an audio buffer 38, where audio content is stored according to network addresses. In other embodiments, the audio buffer may be located at other points in the network. As audio content is received from time to time, the NAFS 36 does two things. First, it buffers the audio content into the audio buffer 38 inside of network addressable files, databases, packets or similar data structures. Second, the NAFS 36 sends a source packet 40 to a NADS 42. The source packet includes pertinence data about the audio content that is stored in the audio buffer 38, but, in this illustrative embodiment, does not include the audio content itself. This arrangement serves the first purpose of limiting the amount of data transferred while still notifying consumers of the availability of the audio content according to its pertinence data.

The NADS 42 transfers or transforms the source packet 40 data into a directory packet 48, which is communicated to one or more NART's 50. The transformation process may include culling pertinent portions of the source packet pertinence data, and may include the addition of some NADS generated pertinence data to the directory packet 48. An example of this would be to add priority data, which could elevate or reduce the priority rating of the audio content represented by the source packet. The directory packet 48 may be a part of a stream of directory packets, which is called a directory stream. The directory stream typically includes directory packets with pertinence data for plural NAFS's, each of which receives audio content from their respective audio sources. In the illustrative embodiment, the NART includes a selection process that is tailored to the consumer's interests with respect to what kinds audio content are desirable to reproduce. A simple example of this would be to reproduce audio packets received from the police department of a particular jurisdiction. If one or more directory packets satisfy the selection requirements, then the NART 50 communicates a packet request 44 to the NAFS where the addressable buffer 38 is located. The packet request 44 addresses the network address of the audio content identified in the selected directory packet. In response to the packet request 44, the NAFS 36 recalls the selected audio content from the audio buffer 38, and forwards the audio packet 46 to the NART 50. Finally, the NART reproduces the audio content using an audio reproduction process 52. This arrangement serves the purpose of only sending the bulk of audio content to the NART that specifically request such content. With respect to the concept of a "packet", those skilled in the art will appreciate that this terminology exhibits a range of flexibility that is dependent upon the network architecture, system bandwidth, processing speed and other factors. At an abstract level, a "packet" can be a block of data being transmitted over a network, or the same encapsulated data managed by a network terminal or other device during assembly for transmission or disassembly upon receipt. In addition, a packet can be any block of data, plural related blocks of data, or files that are stored on a server files and are available for download. A file is generally a larger agglomeration of data than a packet. Similarly, such information may be stored in a database system, which will generally associate content with pertinence data and allow for efficient storage and retrieval of the content. Addressing, and network addresses are dependent upon the network model and addressing scheme, as will be appreciated by those skilled in the art. In the case of an Internet model, employing the TCP/IP family of protocols, the uniform resource locator ("URL") is one appropriate addressing designator. The system architecture depicted in FIGS. 1 and 2 is intended to be exemplary. Other more complex arrangements of the teachings herein can be readily conceived. For example, a single receiving terminal (NART) could receive more than one directory stream, and filter these streams according to selection rules to select audio content and segments for reproduction and playback. In one example of this arrangement, a service company operates a national directory stream, while someone in a local community operates a stream focused on channels of local interest. The NART operates as a scanner that is configured to pick up both streams of information. In another example, where NAFS and NADS are the same computer, each terminal operates as a scanner to produce a low-bandwidth directory stream that notifies the NARTs of activity, and where the NART connects to each combined NAFS and NADS directory stream independently, thereby allowing user-to-user operations without a central NADS while keeping the benefit of low bandwidth, including not sending audio content that is not of interest to particular listeners. In both of these exemplary embodiments, the NART monitors more than one directory stream, but each directory stream itself follows the operation and structure described in the application.

Figure 3:
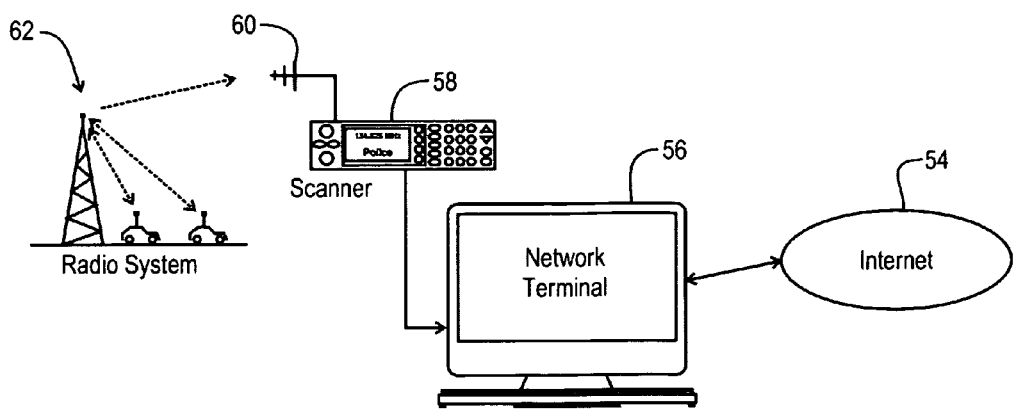
FIG. 3 is a drawing of a network audio feed station according to an illustrative embodiment of the present invention.

Reference is directed to FIG. 3, which is a drawing of a radio receiver based network audio feed station according to an illustrative embodiment of the present invention. In this embodiment, the NAFS includes a personal computer 56 configured as a network terminal operable to communicate with the Internet 54, which enables the network communications functionality in this illustrative embodiment. The audio source is a multi-band radio scanner. The scanner 58 is coupled to an antenna 60 that is directed to receive radio transmissions from a local radio system 62, such as a local police department dispatch radio system. As intermittent communications emanate from the radio dispatch system 62, they are received by the antenna 60 and discriminated by the scanning receiver 58. The operational principles of scanning radio receivers are known to those skilled the art. The discriminated audio content is coupled to the network terminal, where it is digitized and assembled for subsequent processing and communication. In addition to the audio content, certain digital information may be transferred from the scanner 50 to the network terminal 56. This information can include, but is not limited to, the frequency of reception, a squelch code or talk group identity, the name of the radio system, a user entered alpha-numeric tag, a priority indicator, or other data related to the radio communication or to the scanning radio receiver 58. In addition to data transferred from the scanner 58 to the network terminal 56, the network terminal 56 may be used to add pertinence data to the assembled packets or files of data and audio content.

Figure 4:
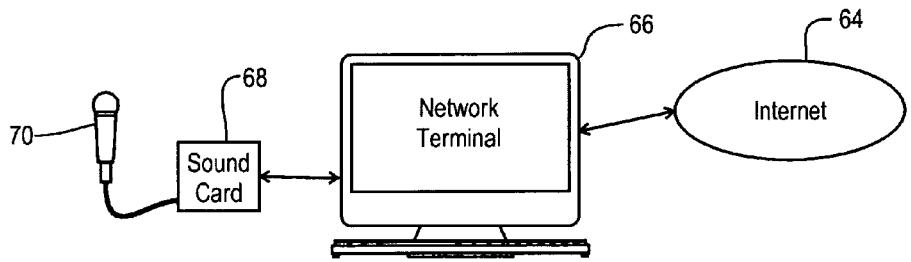
FIG. 4 is a drawing of a network audio feed station according to an illustrative embodiment of the present invention.

Reference is directed to FIG. 4, which is a drawing of a network audio feed station according to an illustrative embodiment of the present invention. In this embodiment, the NAFS includes a personal computer 66 configured as a network terminal operable to communicate with the Internet 64, which provides the network communications functionality in this embodiment. The audio source is a sound card 68 coupled to the computer 66, as are known to those skilled in the art. The audio input to the sound card 68 is a microphone 70 in this illustration, however, any analog audio source may be substituted for the microphone 70. This arrangement enables a user to submit a wide variety of audio content into the network directory server teachings of the present invention. The audio content is digitized by the sound card 68 or the network terminal 66 and assembled into data packets or files for subsequent processing and communication. In addition to the audio content, other digital information may be assembled into the packets or files, such as descriptive data, time stamps, priority data and so forth.

Figure 5:
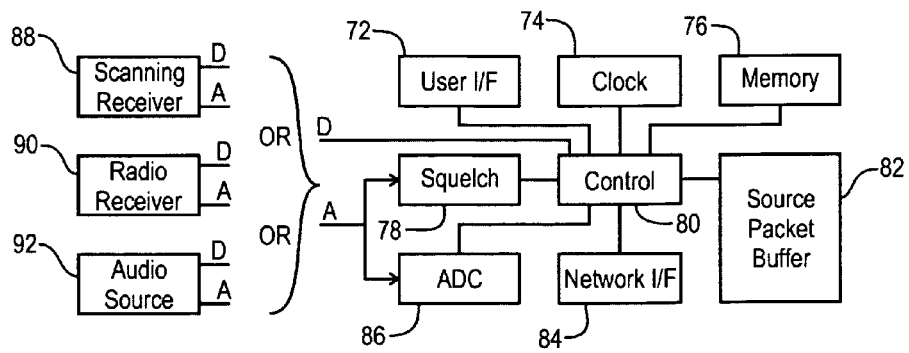
FIG. 5 is functional block diagram of a network audio feed station according to an illustrative embodiment of the present invention.

Reference is directed to FIG. 5, which is functional block diagram of a network audio feed station according to an illustrative embodiment of the present invention. The NAFS of this embodiment is configured to receive intermittent audio content from any of a variety of audio sources. This figure illustrates a scanning radio receiver 88, a fixed frequency radio receiver 90, and an analog audio source 92, although any other type of audio source may be utilized. Each of these sources outputs analog audio signals ("A"). The analog signals are coupled to an analog to digital converter ("ADC") 86 and to a squelch circuit 78. The ADC 86 is used to digitize the audio content for subsequent processing in the digital domain by the central controller 80 and other circuits in the NAFS. The squelch circuit 78 provides the function of determining when an element of audio content begins and ends, and is also coupled to the central controller 80. While the audio coupling and squelch processes in FIG. 5 are directed to and analog source with corresponding squelch detection techniques, the present invention contemplates a much broader range of audio content detection techniques. These techniques include no-carrier noise detection within the receiver, with a digital logic output to the NAFS. Also, communications can be detected within the NAFS by analog or digital analysis of the incoming audio, which can be testing for sub-audible tones, other coded squelch signals, inter-transmission white noise, or speech audio energy. In the case of digital audio reception, the signal detection can be driven by logical coding as well. The squelch concept and function will be more fully discussed hereinafter. Each of the audio sources may also output a digital signal ("D"), which may include the pertinence and other data discussed hereinbefore and elsewhere in this disclosure. The digital data is coupled to a central controller 80. The central controller 80 is programmed to assemble the digitized audio content and the digital pertinence data into audio packets or files that are stored in an audio packet memory buffer 82.

The NAFS illustrated in FIG. 5 also includes a user interface circuit 72, which is a computer keyboard, mouse, display, and other components as are known to those skilled in the art. The user interface 72 is coupled to the central controller 80, which is a personal computer microprocessor in the illustrative embodiment. A clock circuit 74 is coupled to the central controller 80. The clock circuit 74 provides time stamp information that is added to the audio content packets or files. The time stamp may include the start time and end time for each packet or discrete audio communication, and may include a duration field, calculated from the start and end times. A memory 76 is provided for general data storage in the NAFS. A network interface circuit 84 provides access to the network by the NAFS.

Figure 6:
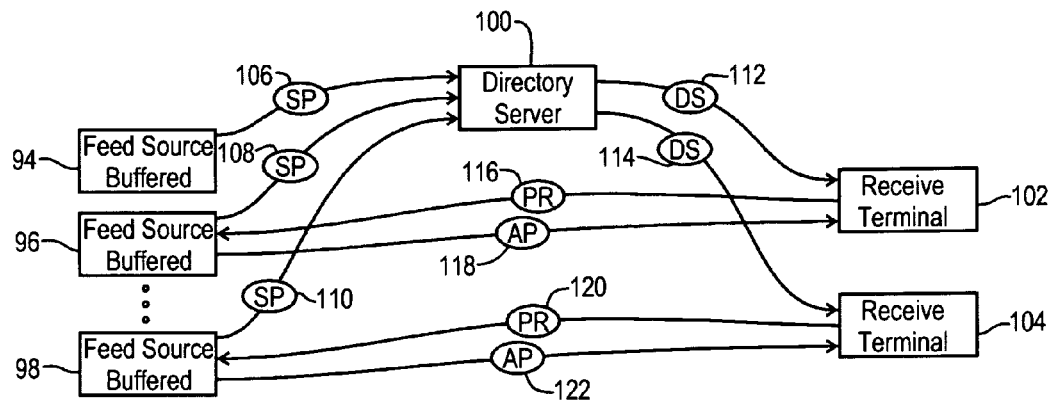
FIG. 6 is functional block diagram showing information flow according to an illustrative embodiment of the present invention.

The arrangement and structure of the data flow according to the teachings of the present invention can be configured in a wide variety of ways. Because the audio content distribution occurs through a network, the storage location and distribution topology can be configured according to the needs of users, the network, and traffic load. FIGS. 6 through 9 illustrate just a few such examples. Reference is now directed to FIG. 6, which is functional block diagram showing information flow according to an illustrative embodiment of the present invention. Plural NAFS 94, 96, 98 are each configured to include a buffer for audio content packets or files, so the addressable storage of audio content is local to each NAFS 94, 96, 98, and each sends its respective source packets 106, 108, 110 to a common directory server 110. The directory server 100 assembles a directory stream of directory packets based on the plural source packet feeds 106, 108, 110. The directory streams are communicated over the network 112, 114 to plural NART 102, 104. Of course, the number of NAFS and NART in FIG. 6 are merely illustrative, and in an actual deployment of the technology, it is envisioned that the numbers would be much larger. As each NART 102, 104 receives the respective directory stream 112, 114, the pertinence data in the streams is compared to the particular user's selection criteria. As a match occurs, indicating that audio content is desirable to the user, the NART requests the actual audio content through the network. In the case of NART 102, a packet request 116 is sent to NAFS 96 because the directory stream 112 included desirable audio content that was addressed to that NAFS. The NAFS 96 receives the packet request 116, and responds by sending the requested audio packets 118 to the requesting NART 102. Similarly, in the case of NART 104, a packet request 120 is sent to NAFS 98 because the directory stream 114 included desirable audio content that was addressed to that NAFS. The NAFS 98 receives the packet request 120, and responds by sending the requested audio packets 122 to the requesting NART 104. Thusly, the configuration of FIG. 6 uses each NAFS as an audio content buffer location. A common directory server is used to accumulate the various source packets and assemble a directory stream therefrom. The directory stream is sent to plural NART, which each make individual packet requests to the particular NAFS buffers where the desirable audio content is stored.

Figure 7:
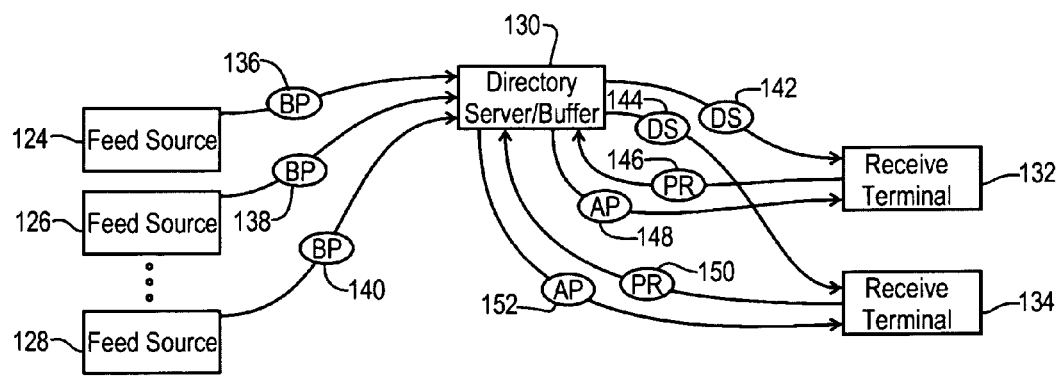
FIG. 7 is functional block diagram showing information flow according to an illustrative embodiment of the present invention.

Reference is directed to FIG. 7, which is functional block diagram showing information flow according to an illustrative embodiment of the present invention. The implementation illustrated in FIG. 7 differs from that of FIG. 6 in that the audio content buffers are located in the directory server instead of the individual NAFS. Three NAFS 124, 126, 128 communicate respective buffer packets 136, 138, 140 to a NADS 130. A buffer packet differs from the aforementioned source packets in that the buffer packet includes the audio content and the pertinence data. Either of the NAFS 124, 126, 128 or the NADS 130 can perform the squelch function and attach the time stamp data to the buffer packets in this embodiment. As the buffer packets are received, the NADS 130 stores the digitized buffer packets into an audio content storage buffer located in the NADS 130. At the same time, the NADS 130 prepares a directory stream of directory packets and transmits them 142, 144 to the two NART 132, 134. Each of the NART 132, 134 compare the pertinence data in the received directory streams 142, 144 to their respective selection criteria to determine of the information is desirable to the user. If a match occurs at NART 132, then a packet request 146 is sent to the NADS 130, which addresses the audio content packets located in the buffer, or generated upon request from information content located in the buffer. The NADS responds by communicating the requested audio packets 148 to the requesting NART 132, which can then reproduce the requested and received audio content to the user. Similarly, if a match occurs at NART 134, then a packet request 150 is sent to the NADS 130, which addresses the audio content packets located in the buffer, or generated upon request from information content located in the buffer. The NADS responds by communicating the requested audio packets 152 to the requesting NART 134, which can then reproduce the requested and received audio content to the user.

Figure 8:
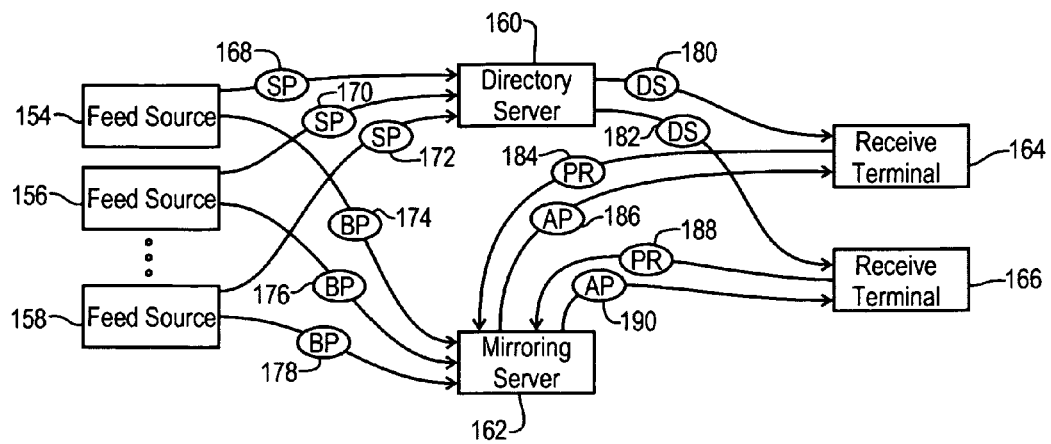
FIG. 8 is functional block diagram showing information flow according to an illustrative embodiment of the present invention.

Reference is directed to FIG. 8, which is functional block diagram showing information flow according to another illustrative embodiment of the present invention. FIG. 8 introduces the concept of a mirroring server to the network topology for implementing the directory server audio content distribution through a network under the present invention. The mirroring server 162 is beneficial because it provides redundancy to the storage of audio content within the network and because it allows controlled distribution from network locations best equipped to handle heavy network traffic loads. Plural NAFS 154, 156, 158 monitor their respective audio sources (not shown) and on receipt of audio content, forward their respective source packets 168, 170, 172 to a directory server 160. The directory server assembles a directory stream of directory packets and communicates them 180, 182 to respective NART 164, 166. The NADS appends each directory packet with the network address of each audio content buffer packet, or network address of an audio content file corresponding to this audio content. In this illustrative embodiment, those addresses are located in the mirroring server 162. The audio content is provided to the mirroring server 162 by the plural NAFS 154, 156, 158 through the communication of respective buffer packets 174, 176, 178. The mirroring server stores the buffer packets into an audio content memory buffer or file system, which is addressable over the network. During operation, each NART 164, 166 monitors the respective directory stream 180, 182 for pertinent content as compared to the respective user's selection criteria. In the case of NART 164, when a pertinent directory packet 180 is detected, a packet request 184 is sent to the mirroring server 162. The mirroring server 162 responds by recalling the corresponding file or audio packet 186 from the buffer and sending it to the requesting NART 164, which can then reproduce the audio content stored therein. Similarly, in the case of NART 166, when a pertinent directory packet 182 is detected, a packet request 188 is sent to the mirroring server 162. The mirroring server 162 responds by recalling the corresponding audio packet 190 from the buffer and sending it to the requesting NART 166, which can then reproduce the audio content stored therein. The network addressing scheme is pre-arranged between the directory server 160 and the mirroring server 162, so that the directory streams 180, 182 contains audio file or packet network addresses located in the mirroring server 162. Note that in this topology, the audio content buffer packets can also be stored in buffers in the respective NAFS 154, 156, 158 so that some NART can access the same audio content directly from those NAFS. There can also be multiple mirroring servers disposed through the network so as to distribute the network traffic load.

In another illustrative embodiment (not shown), the plural NAFS 154, 156, 158 send one or more buffer packets to the mirroring server 162, which assigns a network address to the audio content and transmits a source packet including the assigned network address to directory server 160, thereby eliminating the need for a prearranged network addressing scheme. In still another illustrative embodiment (not shown), in place of buffer packets 174, 176 and 178, the several NAFS 154, 156 and 158 transmit audio to mirroring server 162 through a conventional audio stream. In such a configuration, pertinence data may be optionally transmitted in related data packets, with an association established through timestamps on the data and audio packets. Alternatively, if the nature of the audio source at a NAFS terminal is predetermined and known to the mirroring server, pertinence data may not be transmitted by the NAFS, but added at the mirroring server if appropriate and needed for further processing of the audio content.

Figure 9:
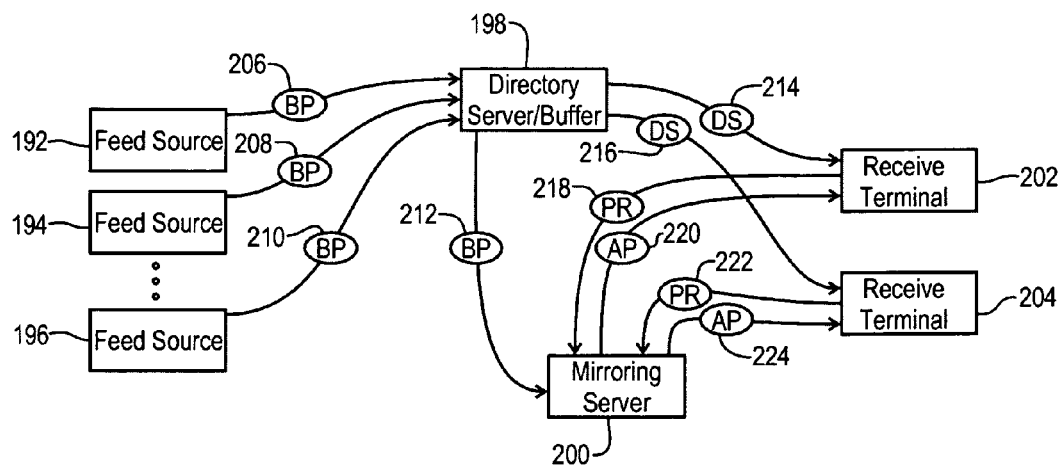
FIG. 9 is functional block diagram showing information flow according to an illustrative embodiment of the present invention.

Reference is directed to FIG. 9, which is functional block diagram showing information flow according to an illustrative embodiment of the present invention. FIG. 9 illustrates another implementation of the use of a mirroring server 200 under the teachings of the present invention. The embodiment of FIG. 9 differs from that of FIG. 8 in that the buffer packets 212 in FIG. 9 are provided by the directory server 198. A review of FIG. 8 will indicate that the buffer packets of that embodiment were created in the respective NAFS. Now, returning to the embodiment of FIG. 9, each of the NAFS 192, 194, 196 monitor an audio source (not shown) and communicate respective buffer packets 206, 208, 210 to the directory server 198 upon detection of audio content. The packets transmitted 206, 208, 210 are termed "buffer packets" because they comprise both the pertinence data and the audio content. The directory server 198 includes an audio content storage buffer into which the buffer packets, or content derived therefrom, are stored. Note that the directory server 198 can add additional addressing and pertinence data to the packets or packet derived content as they are stored in the buffer. As the buffer packets are received and stored, the directory server 198 provides a mirroring stream of buffer packets 212 to the mirroring server 200. The mirroring server 200 stores the packets into a buffer, which is addressable through the network. Also, as the buffer packets 206, 208, 210 are received by the directory server 198, the directory server 198 prepares a directory stream of directory packets, which are communicated 214, 216 to plural NART 202, 204. The directory server 198 controls the addressing of the directory streams 214, 216, as to the location of the audio content storage buffers that each NART 202 is to access. In FIG. 9, both NART 202, 204 access the audio content through the mirroring server 200. In the case of NART 202, when a pertinent directory packet 214 is detected, a packet request 218 is sent to the mirroring server 200. The mirroring server 200 responds by recalling the corresponding audio packet 220 from the buffer and sending it to the requesting NART 202, which can then reproduce the audio content stored therein. Similarly, in the case of NART 204, when a pertinent directory packet 216 is detected, a packet request 222 is sent to the mirroring server 200. The mirroring server 200 responds by recalling the corresponding audio packet 224 from the buffer and sending it to the requesting NART 204, which can then reproduce the audio content stored therein.

The previous discussions suggest the importance of the role of network addressing in implementing the various illustrative embodiments of the present invention. FIGS. 10 through 15 give specific illustrative embodiments of how a host network addressing scheme and the structure of the data packets of the present invention interplay to enable the flow and control of information, both audio and data, through the network and between the network terminals of the present invention.

Figure 10:
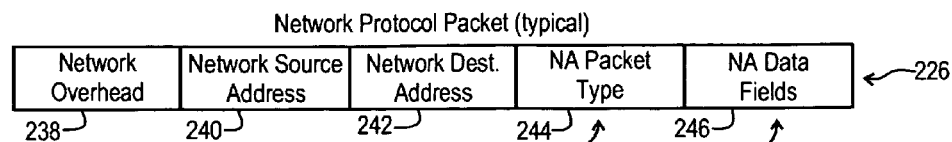
FIG. 10 is a datagram of a network communications packet according to an illustrative embodiment of the present invention.

Reference is directed to FIG. 10, which is a datagram of a network communications packet according to an illustrative embodiment of the present invention. The data packet described is that of a typical host network overhead packet, which could be an Internet TCP/IP packet in some embodiments. The network protocol packet ("NPP") 206 is comprised of network overhead data 238, such as framing, error control, sequencing and so forth, as are known to those skilled in the art. In addition, a network source address 204 and a network destination address 242 are included in each NPP 226, which are used in the network hierarchy from routing packets from source to destination terminals. The NPP 226 also includes a network audio packet type designator 244 and the network audio data fields 246. The network audio packet type designators include source packet, directory packet, audio request packet, audio packet and buffer packet in the illustrative embodiment. It will be appreciated by those skilled in the art that other packet designation systems could be employed and that not every designated type would be required for every embodiment. The network audio data fields 246 can include audio content, pertinence data, and other data used in implementation of the various embodiments of the present invention.

Figure 11:
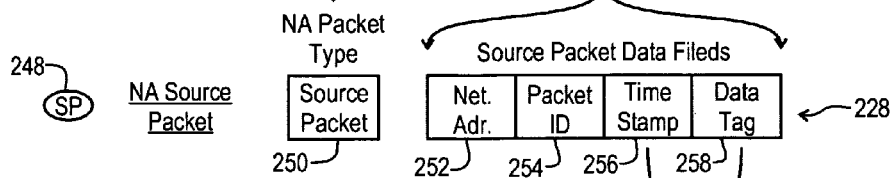
FIG. 11 is datagram of a network audio source packet according to an illustrative embodiment of the present invention.

FIG. 11 is datagram of a network audio source packet 228 according to an illustrative embodiment of the present invention. A network audio source packet 228 is identified on the drawing figures with the "SP" oval symbol 248. A source packet includes data and addressing related to audio content, but does not include the audio content itself. Typically, a source packet 228 is communicated from a NAFS to a NADS, although other applications are contemplated under the teachings herein. The network audio source packet 228 includes a packet type 250 of source packet. The source packet data fields include the network address 252 of the buffer packet or equivalent file that contains the corresponding audio content if such address exists in the NAFS. Note that some NAFS do not buffer audio content, in which case this data field would be omitted or empty, to be completed once the network buffer address becomes known. The source packet 228 also includes a packet identity field 254, which is useful in cases where there is more than one packet associated with audio content stored at a given network address 252. This is useful in situations where a unit of audio content is relatively long, and it is beneficial to limit data packet length due to network communication considerations. It will be appreciated by those skilled in the art that the packet addressing and identity arrangements are dependent upon the network protocol involved. With respect to all of the packet addressing issues discussed herein, those skilled in the art will appreciate that addressing, retrieval and reproduction will employ techniques appropriate to the network technology involved. The source packet 228 also includes a time stamp field 256, which indicates the time and duration of the corresponding audio content. The data field 256 can include an absolute start time and duration of the corresponding audio content, or any other suitable means of marking the time relative to the audio content. The time stamp field 256 is useful for assembling plural packets or discrete communications for coherent time-oriented playback as well as compressing the quiet time between related audio content packets or files. The source packet also contains the aforementioned data tags that are provided by the audio source and the NAFS.

Figure 12:
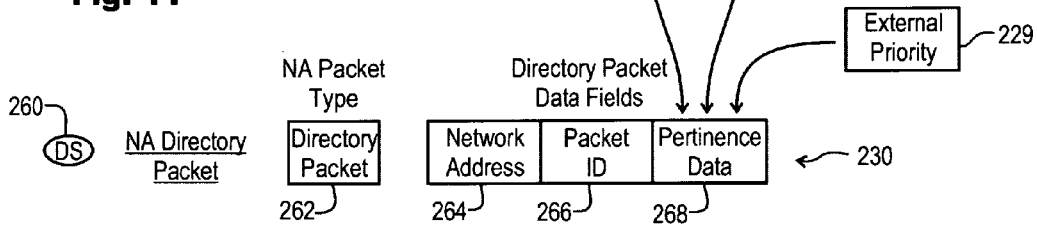
FIG. 12 is a datagram of a network audio directory packet according to an illustrative embodiment of the present invention.

Reference is directed to FIG. 12, which is a datagram of a network audio directory packet 230 according to an illustrative embodiment of the present invention. A network audio directory packet 230 is identified on the drawing figures with the "DS" oval symbol 260. A directory packet includes data and addressing related to audio content, but does not include the audio content itself. Typically, a directory packet 230 is communicated from a NADS to a NART, although other applications are contemplated under the teachings herein. The network audio directory packet 230 includes a packet type 262 of directory packet. The directory packet 230 includes a network address filed 264, which indicates the network address of the buffer packet or file that contains the corresponding audio content. This address field 264 can be update by the NADS to indicate an alternative location of the audio content, such as a buffer in the NADS or a buffer in a network audio mirroring server. The directory packet 230 also includes a packet identity field 266, which is useful in cases where there is more than one packet associated with audio content stored at a given network address 264. The packet identity field may simply be carried forward from the source packet, or it may be changed due to a change in the location of the audio content memory buffer or the arrangement of packets therein. Finally, the directory packet 230 includes a pertinence data filed 268. This field 268 includes the time stamp and data tag from the source packet, and may also include additional external priority data 229, which can be created by the NADS or a user or another terminal on the network. Note that the time stamp and data tag data carried forward from the source packet can also be altered by the NADS to suit operational requirements of the system.

Figure 13:
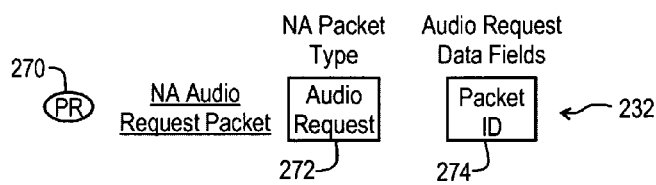
FIG. 13 is datagram of a network audio request packet according to an illustrative embodiment of the present invention.

Reference is directed to FIG. 13, which is datagram of a network audio request packet 232 according to an illustrative embodiment of the present invention. An audio request packet 232 is identified on the drawing figures with the "PR" oval symbol 270. The network audio requests packet 232 includes a packet type 272 of audio request. An audio request packet 232 is typically communicated from a NART to a network terminal that has a audio content memory buffer that stores the desired audio content, such as a buffered NAFS, a directory server or a mirroring server. The audio request packet 232 includes a packet identification data field, as described above. No other data is required since the audio request packet is sub-field of a NPP 226 (see FIG. 10). As such the network address for the corresponding audio content is inserted into the network destination address field in the NPP 226. Similarly, the network address of the requesting NART is inserted into the network source field of the NPP 226 to complete the addressing requirements for reliable network communication.

Figure 14:
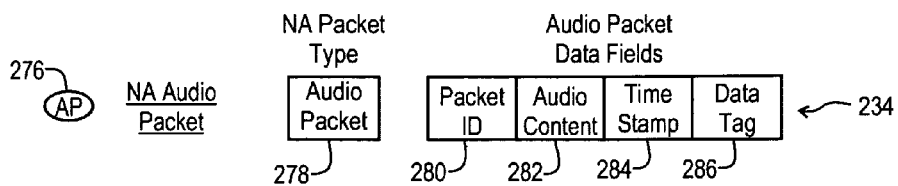
FIG. 14 is datagram of a network audio delivery packet according to an illustrative embodiment of the present invention.

Reference is directed to FIG. 14, which is datagram of a network audio delivery packet 234 according to an illustrative embodiment of the present invention. A network audio packet 234 is identified on the drawing figures with the "AP" oval symbol 276. An audio packet includes the audio content as well as data related to the audio content. Typically, an audio packet 228 is communicated from a NAFS with a buffer, or a directory server of a mirroring server to a NART, although other applications are contemplated under the teachings herein. The audio packet 234 includes a packet type 278 of audio packet. The audio packet includes the packet identification field, which repeats and confirms the identity from the request packet. The audio packet 234 includes the requested audio content in an audio content data field 282. The time stamp 284 and data tag 286 may be included or omitted depending on the embodiment implement. Upon receipt of one or more audio packets 234 by a NART, the packets can be arranged in time and the audio reproduced. The time stamp data can be used to sequence the packets and to compress quiet time between packets, or the reconstruct the quiet time for accurate time sequencing.

Figure 15:
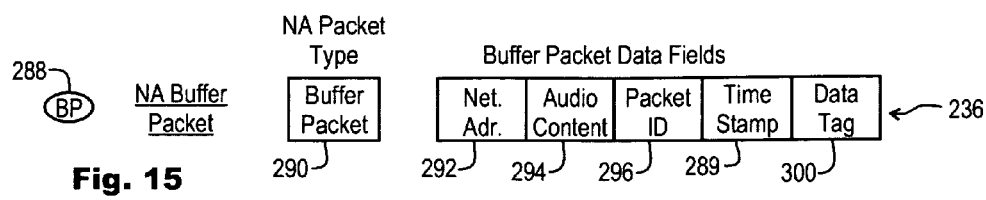
FIG. 15 is datagram of a network audio buffer packet according to an illustrative embodiment of the present invention.

Reference is directed to FIG. 15, which is datagram of a network audio buffer packet 236 according to an illustrative embodiment of the present invention. A network buffer packet 236 is identified on the drawing figures with the "BP" oval symbol 288. A buffer packet includes the audio content as well as data related to the audio content. The buffer packet 236 is used to fill the audio buffer and is used to transfer audio buffers to mirroring servers, and so forth. Typically, a buffer packet 236 is communicated from a NAFS, or NADS or a mirroring server to another NADS or mirroring server, although other applications are contemplated under the teachings herein. The buffer packet 236 includes a packet type 290 of buffer packet. The buffer packet includes all of the aforementioned data fields, including the network address 292, the audio content 294, the packet identification 296, the time stamp 289, and the data tag 300. As the buffer packet is transferred, the data fields may be updated for address corrections, priority changes, and so forth.

Figure 16:
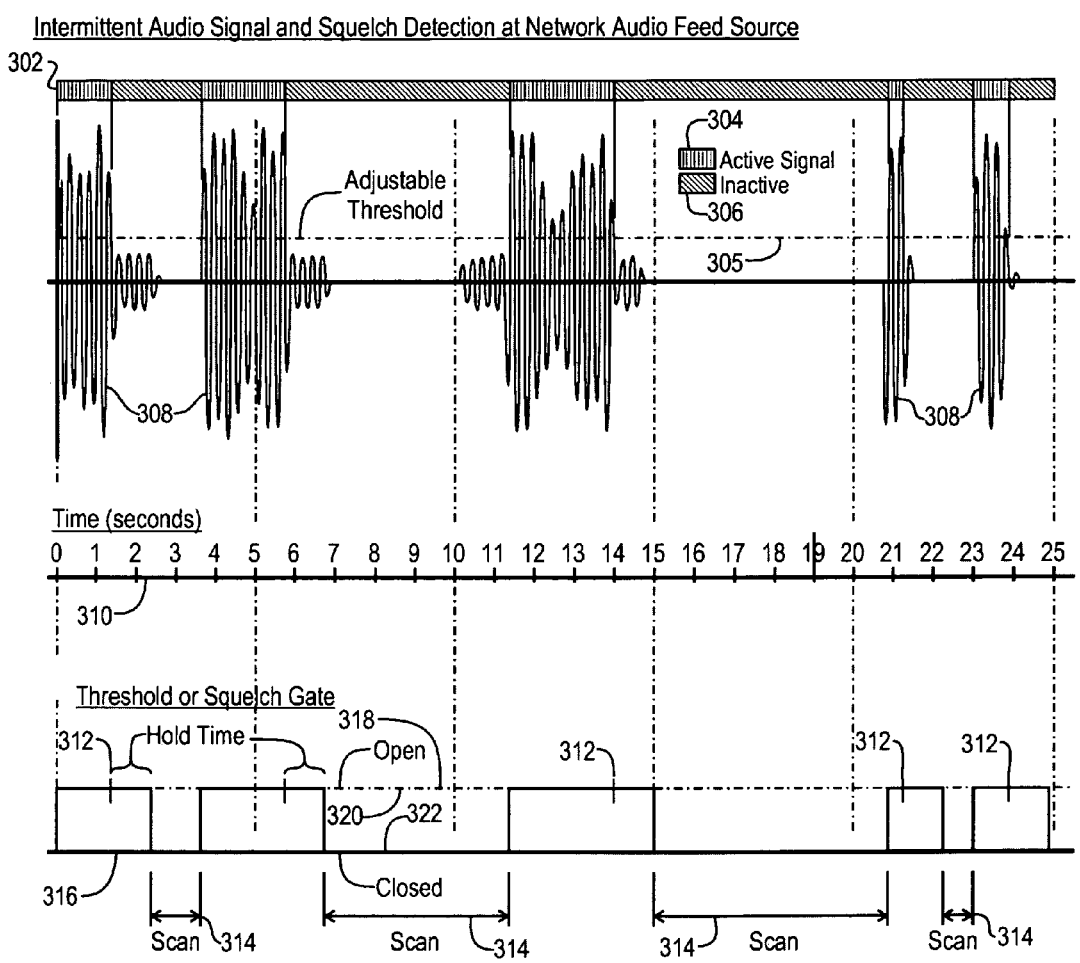
FIG. 16 is an illustration of an intermittent audio squelch detection process according to an illustrative embodiment of the present invention.

FIG. 16 is an illustration of an intermittent audio squelch detection process according to an illustrative embodiment of the present invention. As noted hereinbefore, the squelch detection process is used to determine when active audio content is received from an intermittent audio content source. The squelch process enables the controller to determine the start and end of an audio content segment, which generally defines the duration of a given audio packet. Note that in the case of relatively long audio content segments, the audio content may be stored into plural packets to accommodate network communications functionality. The illustration in FIG. 16 depicts an audio waveform 308 and audio content threshold detection gate-timing diagram according to an illustrative embodiment of the present invention. In the case of a scanning receiver signals, fixed radio receiver signals, and with streaming audio thereof, the audio content is intermittent in nature, as is illustrated by waveform 308. There are periods of quiet, where no signal is present, periods of strong signal levels where meaningful communication occurs, and periods of weak signals and noise such as background sounds, etc. The illustrative embodiment discriminates meaningful signals using an adjustable threshold 305, which is set to a predetermined level, and which may change from time to time. The change may be accomplished manually by a user or automatically by programmed routine. When the signal level meets the threshold level, then active audio content is discriminated. Bar graph 302 in FIG. 16 shows the time periods of active signal 304 versus inactive signal 306. When the signal meets the threshold, the signal becomes active. As time passes 310, it can be appreciated that a significant amount of that time is inactive with respect to signal activity. The illustrative embodiment does not gather and store audio content during the inactive signal periods 306 because this would increase the amount of audio data stored and communicated without conveying useful or desirable information. The inactive periods can be used by the radio receivers to take action and seek other active content. Threshold gate activity is plotted as a timing diagram 316 in FIG. 16, which is superimposed in time 310 with the audio waveform 308. Note that when the signal 308 goes active, the threshold (or squelch) gate opens 318, enabling the subsequent processing of the received audio stream. When the signal 308 goes inactive, the threshold gate closes 322, enabling the subsequent scanning 314 of the next sequential radio source, in the case of a scanning radio audio source. However, strict adherence to the threshold gate closing process results in content capturing that might occur too quickly, catching very brief pauses and short reply-communication response times. To alleviate this issue, a programmable hold time 312 is added to delay the threshold gate closing so as to capture as much meaningful communication as possible. The duration of the hold interval 312 can be set manually or automatically. Over time, the squelching process produces a series of audio content time segments that are stored in respective audio content packets or files, such as buffer packets and audio packets.

Figure 17:
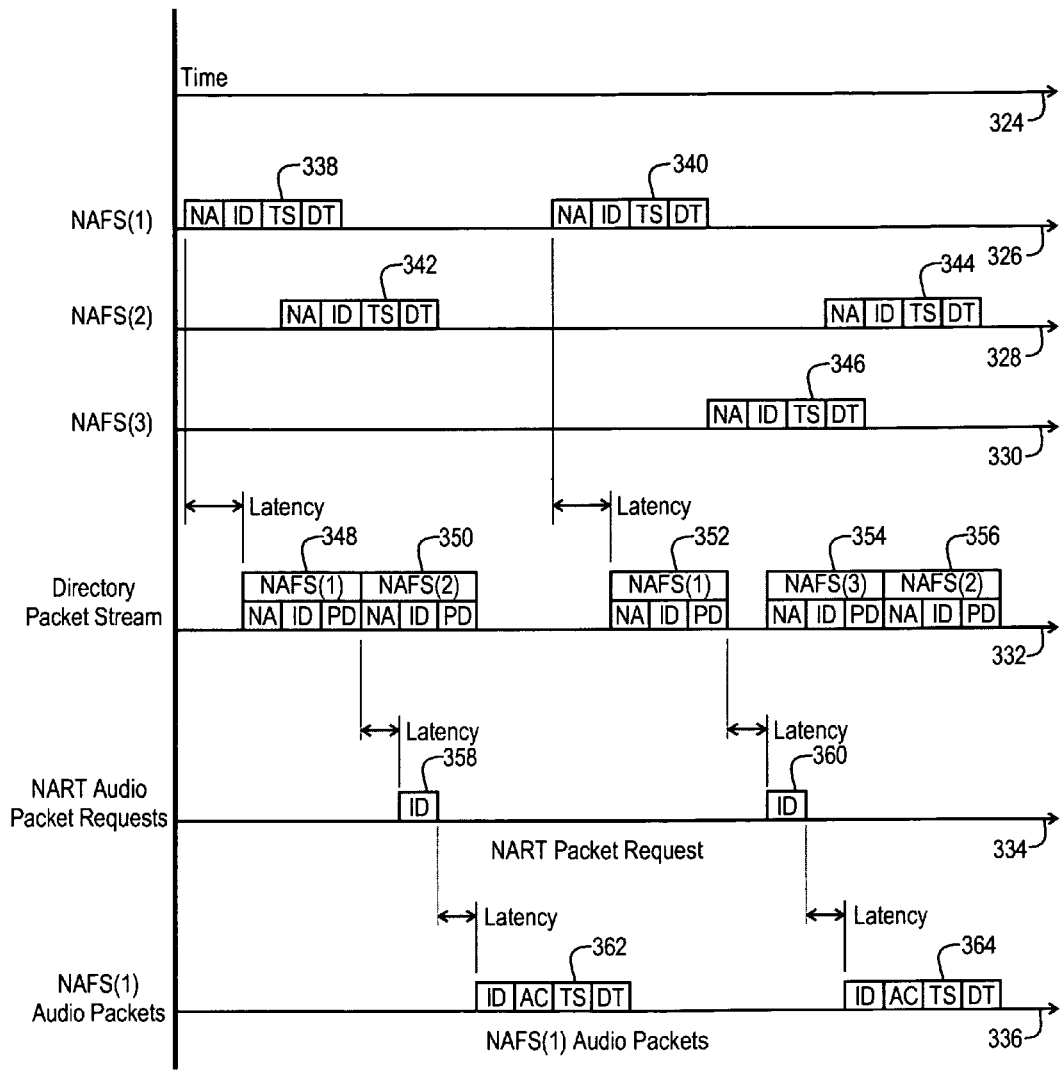
FIG. 17 is a timing diagram for directory stream and audio content delivery according to an illustrative embodiment of the present invention.

Reference is directed to FIG. 17, which is a timing diagram for directory stream and audio content delivery according to an illustrative embodiment of the present invention. In considering the relationship between the real-time audio capture and squelch process, the production and communication of source packets, the subsequent preparation and communication of a directory stream, and the final packet request and audio packet receipt and reproduction process, it will be appreciated that some time lag, or latency, will occur. However, in modern high performance networks, such as the Internet, these latency effects are quite tolerable, and the performance at the NART end of the system is quite satisfying, yielding a sense of real-time performance. FIG. 17 illustrates the timing relationship for three network audio feed sources ("NAFS(x)") feeding into a common NADS, and with a single NART station requesting audio content or some of the audio content. The diagram in FIG. 17 follows a common time line 324. The nomenclature used for all of the packets in FIG. 17 is as follows:

NA—Network Address
ID—Packet Identification
TS—Time Stamp
DT—Data Tag
PD—Pertinence Data
AC—Audio Content The first NAFS(1) signal line 326 includes a two source packet transmissions 338, 240, which occur over the course of time. The second NAFS(2) signal line 328 include two source packet transmissions 342, 244. The third NAFS(3) signal line 330 include a single source packet transmission 346. All of these source packets are sent to a common NADS, which processes the source packets and produces a directory stream 332 of directory packets. The NADS processes the source packets, which includes converting the time stamp and data tag fields into a corresponding pertinence data filed in the directory packets. The processing and communication times yield latency between source packet 338 and directory packet 348. In the same fashion, there is latency between source packet 340 and directory packet 352. The directory stream 332 also includes directory packets 350 and 356 from NAFS920, and directory packet 354 from NAFS(3). All of these directory packets are received by a NART. The NART has a set of selection criteria that requests the audio content only from NAFS(1). Accordingly, the NART packet requests 358, 360 are sent to NAFS(1) along time line 334. Notice that there is a latency between receipt of the directory stream packets 348 and 352 and the actual time the packet requests 358 and 360 are sent. NAFS(1) responds by sending audio packets 362 and 364 to the NART along time line 336. Again, there is some latency between the packet requests and the receipt of the audio packets. Note also that the latency accumulates from the original NAFS source and the ultimate NART audio reproduction. However, this total latency can be quite short, less than one second in a high performance network. Also note that the timing diagram is not to scale, as the packet component lengths would not be equal. In fact, the audio content portion of the packets would be significantly longer than the data content portions of the packets.

Figure 18:
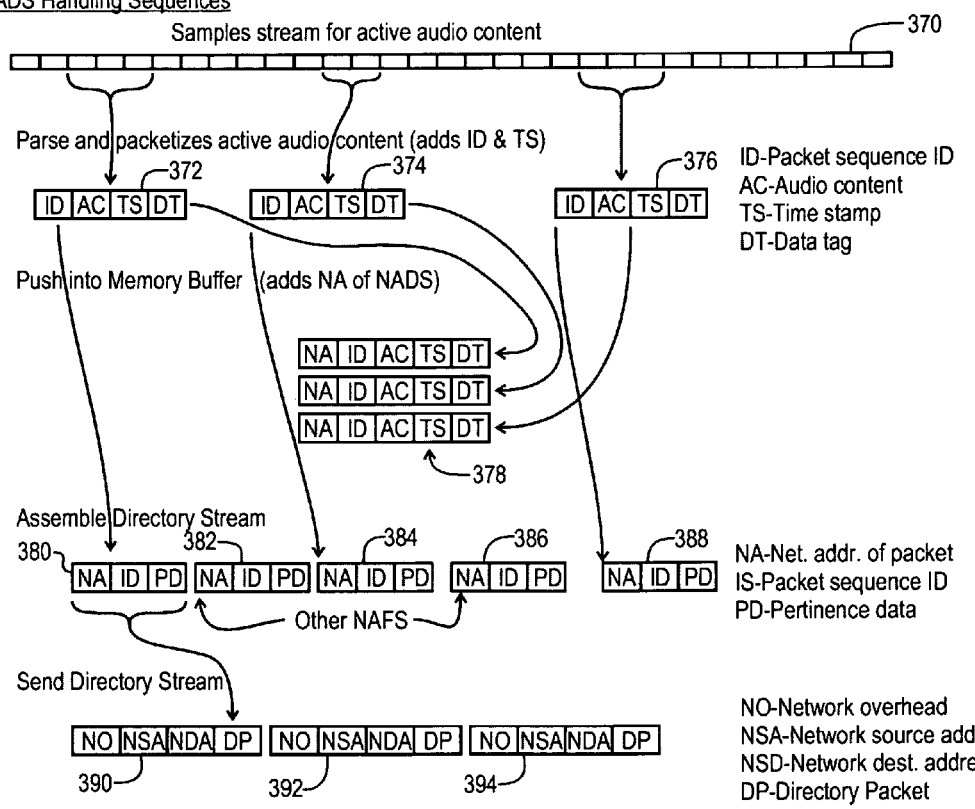
FIG. 18 is a data packet processing diagram for a streaming audio feed source embodiment of the present invention.
Figure 19:
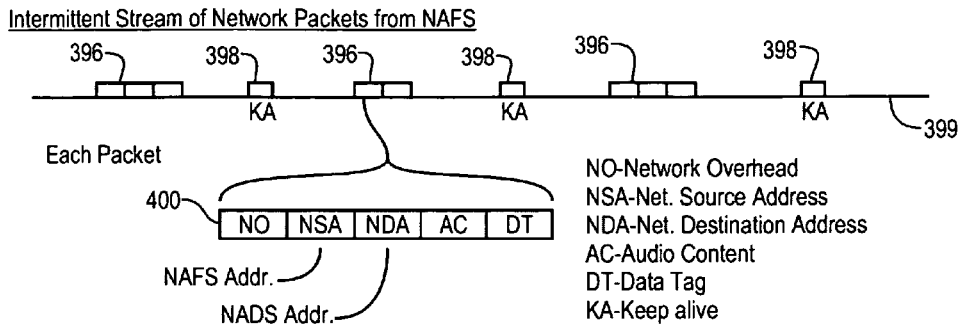
FIG. 19 is a data packet processing diagram for an intermittent audio feed source embodiment of the present invention.
Figure 19:
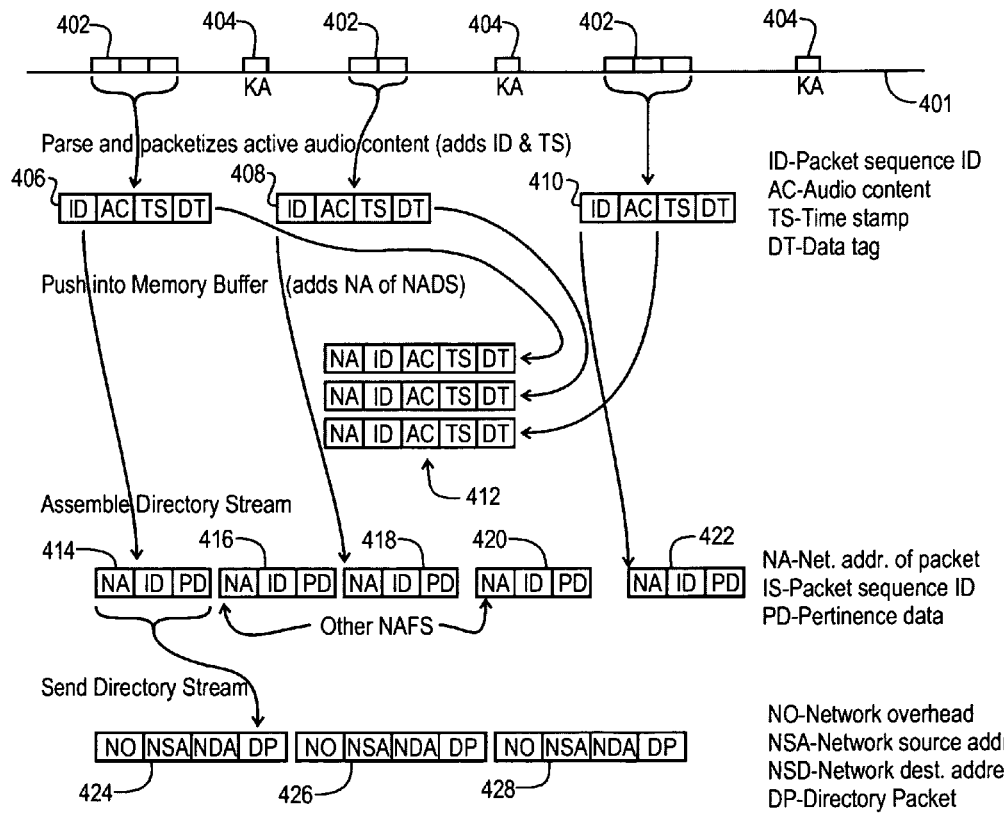
Figure 20:
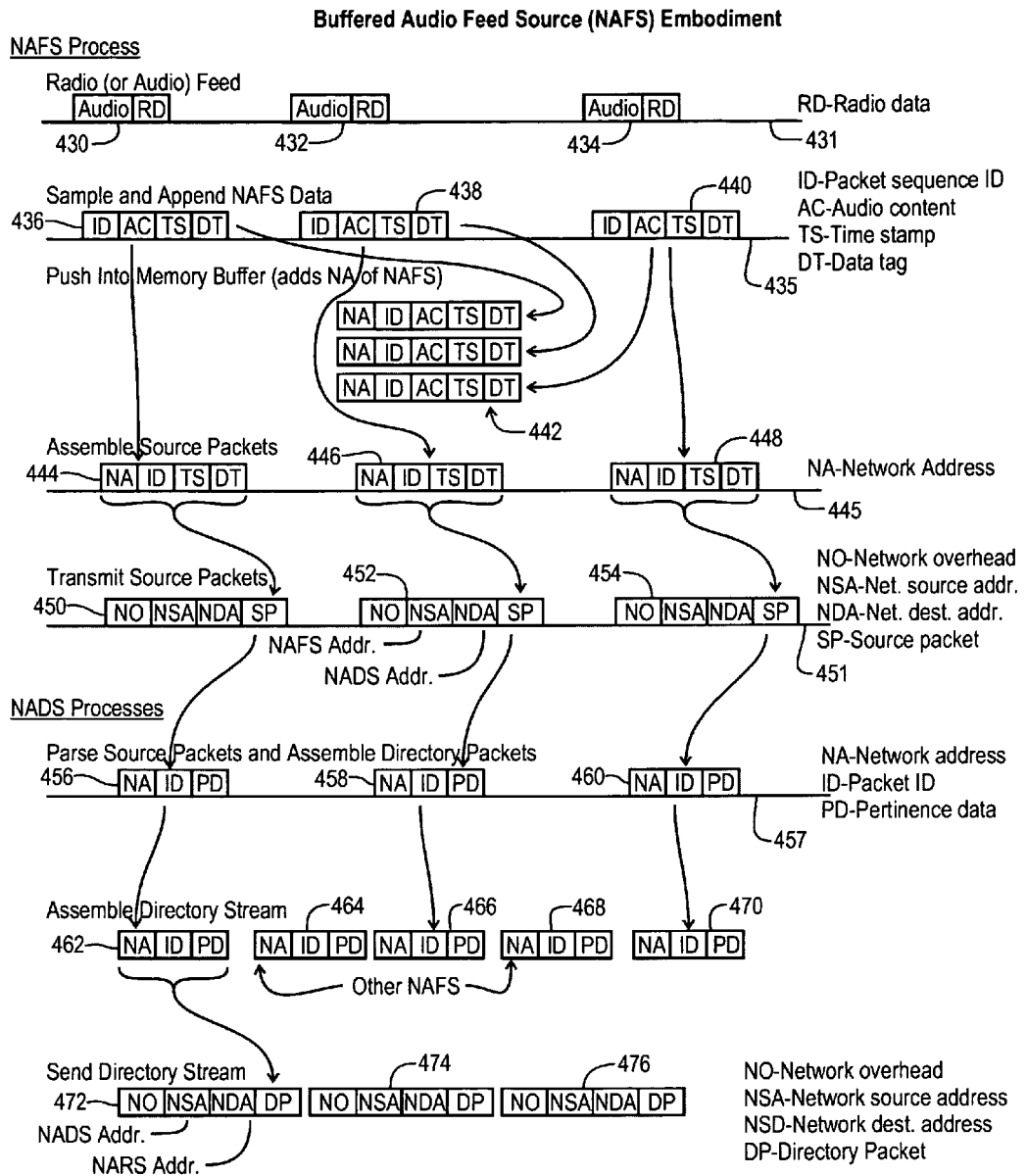
FIG. 20 is a data packet processing diagram for a buffered audio feed source embodiment of the present invention.

As discussed hereinbefore, there are several different kinds of audio sources coupled to the network terminals of the present invention. There can also be various kinds of network terminals employed. In particular, the NAFS terminals may range from simple "Internet radio" streaming sources to more sophisticated buffered audio content sources described with regard to illustrative embodiments of the present invention. These factors affect the nature of data processing and packet flow through the systems and methods of the present invention. FIGS. 18 through 20 provide three distinct illustrative embodiments that articulate principal features of these distinctions, which may be applied alone or in combination with a large range of implementations of the present invention. FIG. 18 addresses a continuous stream of audio content packets fed to a buffering NADS. FIG. 19 addresses an intermittent audio content source coupled to a buffering NADS. FIG. 20 addresses an intermittent audio content source coupled to a buffering NAFS. Each of the embodiments is more fully discussed below.

Reference is directed to FIG. 18, which is a data packet processing diagram for a streaming audio feed source embodiment of the present invention. In this embodiment, a continuous stream of audio content packets 366 is provided from a network source, such as an Internet radio source. A typical packet 368 illustrates one of plural streaming packets, which includes the network overhead data fields and the content specific data fields. The network overhead fields include the "NO" network framing and error management fields as well as the "NSA" source address and "NDA" destination address fields. The content specific fields include the "AC" audio content and "DT" data tag fields. Note that because the audio stream is continuous, does not imply that the audio content is continuous. In many instances, the audio content is intermittent, with a large quantity of inactive periods. Because of this, the NADS receives the audio stream 370 and performs a sampling process to detect active audio content in the stream 370. The previously discussed squelch process is one way to detect active audio content. When active audio content is detected, then the NADS creates buffer packets 372, 374, 376. The buffer packets are stripped of the network overhead information and formatted according to the teachings of the present invention. In particular, a typical buffer packet includes a packet identification "ID", the audio content "AC", the time stamp "TS", and the data tag "DT". The accumulated buffer packets 372, 374, 376 are pushed into and audio content memory buffer 378.

At the same time the buffer packets are pushed into the buffer 378, the NADS assembles the directory stream with directory packets 380, 384, 388 corresponding to the continuous stream NAFS 370 active audio content. FIG. 18 also illustrates the additional directory packets 382, 386 that are interlaced with the NAFS 370 packets, as would be expected in a practical application of the present invention. Each directory packet includes the network address "NA" for the buffer location, the packet identification "ID", and the pertinence data "PD". Together, these create a directory packet. The each directory packet "DP" is inserted into a network overhead frame 390, 392, 394, which include the aforementioned network overhead fields. The network frames are communicated to one or more NART, which process and request audio content in the manner described hereinbefore.

Reference is directed to FIG. 19, which is a data packet processing diagram for an intermittent audio feed source embodiment of the present invention. In this embodiment, an intermittent stream of audio content is provided from a NAFS that conducts the active audio content determination process, and communicates a steam of intermittent content 399. The stream is comprised of bursts of data with audio content 396 and keep alive "KA" packets 398 which are used to maintain the network communication link. Each individual audio content packet 400 is a network packet. A typical packet 400 includes the network overhead data fields and the content specific data fields. The network overhead fields include the "NO" network framing and error management fields as well as the "NSA" source address and "NDA" destination address fields. The content specific fields include the "AC" audio content and "DT" data tag fields. The NADS receives the network stream 401 of intermittent audio content packets 402 and keep alive packets 404. These packets are processed and parsed into buffer packets 406, 408, 410. The buffer packets are stripped of the network overhead information and formatted according to the teachings of the present invention. In particular, a typical buffer packet includes a packet identification "ID", the audio content "AC", the time stamp "TS", and the data tag "DT". The accumulated buffer packets 406, 408, 410 are pushed into and audio content memory buffer 412.

At the same time the buffer packets are pushed into the buffer 412, the NADS assembles the directory stream with directory packets 414, 418, 422 corresponding to the intermittent stream NAFS 401 active audio content. FIG. 19 also illustrates the additional directory packets 416, 420 that are interlaced with the NAFS 401 packets, as would be expected in a practical application of the present invention. Each directory packet includes the network address "NA" for the buffer location, the packet identification "ID", and the pertinence data "PD". Together, these create a directory packet. The directory packet "DP" is inserted into a network overhead frame 424, 426, 428, which include the aforementioned network overhead fields. The network frames are communicated to one or more NART, which process and request audio content in the manner described hereinbefore.

Reference is directed to FIG. 20, which is a data packet processing diagram for a buffered audio feed source embodiment of the present invention. In this embodiment, the NAFS processes an intermittent audio source and buffers the audio content for access directly from the NAFS. In the prior two embodiments, the buffer was located at the NADS. IN FIG. 20, the NAFS receives an audio stream 431 from an audio source, such as a radio receiver. The audio stream is comprised of plural audio packets 430, 432, 434. Each audio packet includes the raw audio from the radio and the radio data "RD", which may include the frequency of reception, talk group identity, alphanumeric descriptors and so forth. The NAFS samples the stream to locate audio content and appends the buffer packet data fields to the steam to create a buffer packet stream 435. The buffer packet stream 435 consists of plural buffer packets 436, 438, 440. A typical buffer packet includes a packet identification "ID", the audio content "AC", the time stamp "TS", and the data tag "DT". The accumulated buffer packets 436, 438, 440 are pushed into and audio content memory buffer 442, which is located in the NAFS in this embodiment.

At the same time the buffer packets are pushed into the buffer 442, the NAFS assembles the source packet stream 445 source packets 444, 446, 448. Each source packet consists of the network address "NA", the packet identification "ID", the time stamp "TS", and data tag "DT" as described hereinbefore. The source packets 444, 446, 448 are incorporated into a steam of network source packets 451, which inserts them into network packets 450, 452, 545 by adding the network overhead fields described hereinbefore. The network source packet stream is then communicated over the network to a NADS.

The NADS in FIG. 20 parses the source packets to produce a NADS source packet stream 457. The NADS packets 456, 458, 460 are stripped of the network overhead and formatted to contain the network address "NA", the packet identification "ID", and the pertinence data "PD", which is a combination of the time stamp and data tag. The NADS then assembles a directory stream containing directory packets 462, 466, 470 corresponding to the NADS directory stream 457. FIG. 20 also illustrates the additional directory packets 464, 468 that are interlaced, as would be expected in a practical application of the present invention. Each directory packet includes the network address "NA" for the buffer location, the packet identification "ID", and the pertinence data "PD". Together, these create a directory packet. Each directory packet "DP" is inserted into a network overhead frame 472, 474, 476, which include the aforementioned network overhead fields. The network frames are communicated to one or more NART, which process and request audio content in the manner described hereinbefore.

In the foregoing illustrative embodiments, each NART is illustrated to receive a single directory stream from a single directory server. This approach was used for the purpose of clearly describing such embodiments. In other illustrative embodiments, each NART may also be configured to receive, in parallel, directory streams from multiple directory servers. In such a configuration, the NART processes the pertinence data relating to all network-addressable audio communications referenced in each of these directory streams, applying appropriate filtering for selecting desired audio content, and retrieving for playback audio packets or files corresponding to desired audio content. In essence, directory packets from multiple directory servers can be processed similarly and in parallel for generating audio output incorporating audio content referenced in any of these simultaneously monitored directory streams.

In another illustrative embodiment of the present invention, respecting generation of a directory stream or directory packets, the directory server functions are merged with NAFS functions of capturing audio communications, and may also be merged with the mirroring server functions of buffering audio content in a network addressable file system. In these embodiments plural NAFS terminals send directory packets to a single NART describing audio content locally captured at each respective NAFS, and the NART selects audio communications of interest from each of these NAFS/NADS combination servers, typically in accordance with selection criteria based on pertinence data transmitted in the directory packets.

In certain illustrative embodiments, a NART receives directory stream information regarding a large volume of network addressable audio packets or files, which are available from various network servers upon request. The NART applies selection filters to discriminate among this large volume of available audio content, such as filters based on pertinence data, audio source data, or audio priority data, to select a subset of the available audio content for retrieval and playback. If the selection filter does not select an audio segment based on the information available in the directory packet, the terminal can disregard the packet and not request said audio content, or store the packet and re-evaluate the priority of that audio content at another time when it may become the most valued available communication. Collisions may arise when new audio content is available simultaneously, or nearly simultaneously, from multiple sources. Such collisions may be resolved in favor of higher priority content, or continuity from previously played audio content, in accordance with user preferences. Current and recent audio from various sources can be interleaved, for example gaps in a higher-priority intermittent communication can be filled with recent activity that was assigned a lower priority. Audio content identified in directory packets, and audio content retrieved in accordance with information provided in directory packets, will typically be new and timely content that was just captured from an external audio source and made available by a NAFS terminal. For example, this content will typically be current and nearly real-time, albeit delayed by the extent necessary for reasonable network latency and server processing. Such audio content will have been captured by NAFS, and then made available on the network, only after the directory stream connection was established between NADS and NART. In this sense, the directory stream is a reference to current activity and new audio content, not merely a listing or directory of previously stored audio files available on a network server.

In certain illustrative embodiments, audio content is captured at a NAFS terminal entirely before the audio content is made available on the network. For example, audio may be written to a file, with a directory packet announcing availability of the file only transmitted to a NART after a squelch or similar test triggers the end of file writing for that specific audio content. In this case, the pertinence data in the directory packet may include information about the duration of the audio content. Conversely, to reduce latency in audio distribution through the system, audio may be made available through the network before the end of the audio content has been detected at the NAFS terminal. In this case, a directory packet is sent upon the start of file writing, and NART terminals begin retrieving the audio content before the audio content has been fully captured. Presuming that the audio content is broken into multiple packets, and played back at the NART at a real-time rate, the transmission of audio packets can be kept ahead of the playback but within the section of audio content already buffered.

In an illustrative embodiment, a directory server accepts incoming TCP/IP connections from both NAFS and NART units on a common blocking port. When a NART connects to the directory server, the NART sends a command to register as an active client. The directory server may optionally respond with a collection of recent directory packets to initialize the NAFS's knowledge of recent and available communications activity, or the directory server may be silent until new communications are available. When a NAFS connects to the directory server, it sends a line of data identifying the network address of a file of intermittent audio content, along with pertinence data such as audio source and time identification information. After this report, the socket between the NAFS and directory server is disconnected. The directory server then relays this information, perhaps with enrichment of the pertinence data, to each of the connected NART clients, or to a subset of the NART clients in accordance with user profile information filtering by pertinence data to reduce bandwith on the outgoing directory connections. Alternatively, the NAFS unit may relay audio information to a remote fileserver or mirroring server, which then takes the role of the NAFS for communications with the directory server in the foregoing example. In another variation, secondary directory servers take the role of NART clients in the foregoing example, where these secondary directory servers in turn relay directory information to NART clients. In the foregoing example, the directory server port behavior allows for simple blocking port operations where all communications events are triggered by a new incoming connection to a single multipurpose port (either by NAFS, remote fileserver, or mirroring fileserver upon availability of a new communications file; or by NART or a secondary directory server upon establishment of a new client connection). It will be evident to those skilled in the art that the port(s) management configuration may be varied, and load distribution systems created, for more efficient management of large directory server throughput, as is known in server administration.

In addition to audio sources referenced by the directory server, the NART may also select intermittent audio communications received from other sources, including signals from a radio receiver unit integrated into the NART and audio streams received over a network. Such a radio receiver element of a NART may be a fixed radio frequency receiver, a tunable radio frequency scanner sequentially sampling numerous frequencies in the local radio frequency environment, or a tunable receiver responsive to a frequency counter detecting radio frequency signals in the local environment. Selected audio signals, from both locally capture and network directory server reference, are integrated into a single audio line output, with time delay if appropriate to prevent collisions. In effect, locally captured and network delivered audio sources are made available on an equal footing, and user selection criteria can seamlessly incorporate signals from both types of sources. A NART may optionally act as a NAFS terminal for some or all locally captured communications, feeding locally captured intermittent audio signals through a network directory server referencing system.

It will be appreciated that embodiments of the present invention described herein may be comprised of one or more conventional processors and unique stored program instructions that control the one or more processors to implement, in conjunction with certain non-processor circuits, some, most, or all of the functions described herein. The non-processor circuits may include, but are not limited to, a radio receiver, a radio transmitter, signal drivers, clock circuits, power source circuits, and user input devices. As such, these functions may be interpreted as steps of a method. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A method of communicating audio through the Internet, comprising the steps of:
   capturing intermittent audio content as it occurs in real time from a scanning radio receiver that receives intermittent radio broadcasts containing audio content, by discriminating said intermittent radio broadcasts using a radio squelch circuit, thereby determining the start and end of plural audio content segments, by a first network terminal;
   forming plural individual audio files corresponding to each of said plural audio content segments;
   storing at least a first one of said plural individual audio files at a network addressable location;
   sending a directory packet including an Internet URL for said network addressable location of said at least a first one of said plural individual audio files, but that does not include said at least one of said plural individual audio files, to a second network terminal, and
   requesting said at least one of said plural individual audio files through the Internet by said second network terminal according to said Internet URL.

2. The method of claim 1, further comprising the steps of:
   sending a source packet including said Internet URL for said network addressable location of said at least a first one of said plural individual audio files to a network directory server by the first network terminal, and wherein
   said sending a directory packet step is accomplished by the network directory server.

3. The method of claim 2 wherein said storing step occurs in a buffer located in the network directory server.

4. The method of claim 1 wherein the scanning radio receiver provides audio source data related to the scanning radio receiver, the method further comprising the step of:
   including audio source data in the directory packet.

5. The method of claim 4, further comprising the steps of:
   applying selection criteria to the audio source data by the second network terminal, and
   if the audio source data does not match said selection criteria, discarding the directory packet.

6. The method of claim 1, further comprising the step of:
   adding source priority data that is related to the audio content to the directory packet.

7. The method of claim 6, further comprising the steps of:
   applying selection criteria to the source priority data by the second network terminal, and
   if the source priority data does not match the selection criteria, discarding the directory packet.

8. The method of claim 1 and wherein said requesting step further includes specifying plural individual audio packets according to plural corresponding Internet URLs, and the method further comprises the steps of:
   receiving plural individual audio packets by said second network terminal, and
   replaying said plural individual audio packets in chronological order.

9. The method of claim 8 wherein the plural individual audio packets are non-contiguous in time, and wherein
   said replaying step occurs in a shortened period of time by compressing the non-contiguous periods between the plural individual audio packets.

10. The method of claim 1, further comprising the steps of:
    sending said at least a first one of said plural individual audio files from the first network terminal to a third network server,
    sending a source packet including said Internet URL of said at least a first one of said plural individual audio files to a network directory server by the third network server, and wherein
    said sending a directory packet step is accomplished by the network directory server.

11. The method of claim 10 wherein said storing step occurs in a buffer located in said network directory server.

12. The method of claim 1 wherein said directory packet includes a time stamp related to the original time of the audio content.

13. The method of claim 1 wherein said storing step occurs in a buffer located in said first network terminal.

14. The method of claim 13, further comprising the steps of:
- transferring a portion of said buffer of containing the plural individual audio files from the first network terminal to a network directory server;
- assigning an Internet address to said portion of said buffer of audio packets at the directory server, and wherein
- said sending a directory packet step is accomplished by the network directory server.

15. The method of claim 1, wherein audio content requested by said second network terminal is reproduced as audio.

16. The method of claim 15, wherein a plurality of audio content is requested by said second network terminal in response to a plurality of directory packets, and a second requested audio content is buffered during reproduction of a first audio content and reproduced after the first audio content is complete.

17. A system for communicating audio through the Internet, comprising:
- a first network terminal operable to capture intermittent audio content as it occurs in real time from a scanning radio receiver that receives intermittent radio broadcasts containing audio content, by discriminating said intermittent radio broadcasts using a radio squelch circuit, thereby determining the start and end of plural audio content segments, and operable to form plural individual audio files corresponding to each of said plural audio content segments,
- operable to form plural individual audio files corresponding to each of said plural audio content segments, and operable to store at least a first one of said plural individual audio files at network addressable location, and operable to send a corresponding directory packet including an Internet URL for said network addressable location of said at least a first one of said plural individual audio files, but that does not include said at least one of said plural individual audio files, to a network directory server, and wherein
- said network directory server, receives said corresponding directory packet, and operates to send at least a portion of said corresponding directory packet into the Internet, and
- a second network terminal operable to receive said at least a portion of said directory packet and operable to request said at least a first one of said plural audio files through the Internet, according to said Internet URL.

18. The system of claim 17, and wherein
said first network terminal is operable to send a source packet including said Internet URL of said at least a first one of said plural individual audio files to a network directory server, and
said network directory server is operable to send said directory packet.

19. The system of claim 18, further comprising:
- a buffer located at said first network server for storing said plural individual audio files by corresponding Internet URLs, and wherein
- said directory packet includes said corresponding Internet URLs, and wherein
- said second network terminal is operable to specify plural individual audio files according to said corresponding Internet URLs.

20. The system of claim 19 wherein said buffer is in a memory located in said network directory server.

21. The system of claim 19, further comprising:
- a third network server, and wherein
- said first network server is operable to transfer a portion of said buffer of plural individual audio files to said third network server, and wherein
- said third network server is operable to reassign said corresponding Internet URLs.

22. The system of claim 17 wherein
said scanning radio receiver provides source data related to said scanning radio receiver, and wherein
said first network terminal is operable to include audio source data in said directory packet.

23. The system of claim 22, and wherein
said second network terminal applies selection criteria to said audio source data, and if the audio source data does not match said selection criteria, discards the directory packet and does not request said audio content.

24. The system of claim 17, and wherein:
source priority data, which is related to the audio content, is added to said directory packet.

25. The system of claim 24, and wherein
said second network terminal applies selection criteria to said source priority data, and if the source priority data does not match said selection criteria, discards the directory packet and does not request said audio content.

26. The system of claim 17 and wherein
said second network terminal is operable to request plural of said plural individual audio files, and to receive and replay said plural individual audio files in chronological order.

27. The system of claim 26 and wherein
said plural individual audio files are non-contiguous in time, and wherein
said second network terminal is operable to replay said plural individual audio files in a shortened period of time by compressing the non-contiguous periods between said plural individual audio files.

28. The system of claim 17 wherein said directory packet includes a time stamp related to the audio content.

* * * * *